United States Patent [19]

Hanford

[11] 4,303,202

[45] Dec. 1, 1981

[54] STRAW DISTRIBUTING APPARATUS

[76] Inventor: Norris E. Hanford, Box 1283, Fort Benton, Mont. 59442

[21] Appl. No.: 101,884

[22] Filed: Dec. 10, 1979

[51] Int. Cl.³ .............................................. A01C 15/00
[52] U.S. Cl. ..................................... 239/664; 239/675; 239/682
[58] Field of Search ............................... 239/166–168, 239/664, 670–673, 675, 681, 682, 684, 687, 689

[56] References Cited

U.S. PATENT DOCUMENTS

| | | | |
|---|---|---|---|
| 1,282,946 | 10/1918 | Rapp | 239/681 |
| 1,536,962 | 5/1925 | Moore | 239/664 |
| 2,583,608 | 1/1952 | Smith | 239/664 |
| 2,684,785 | 7/1954 | Waldorf et al. | 239/675 X |
| 3,756,509 | 9/1973 | Hamnes | 239/664 X |
| 3,831,864 | 8/1974 | Ginther | 239/689 X |
| 3,871,587 | 3/1975 | Gail | 239/664 X |

FOREIGN PATENT DOCUMENTS 1053146  9/1953  France ............................ 239/664

*Primary Examiner*—Johnny D. Cherry

*Attorney, Agent, or Firm*—Arthur L. Urban

[57] ABSTRACT

Apparatus for distributing chopped straw substantially uniformly including a wheeled carriage, a supporting frame disposed on the wheel carriage, and a straw distributing assembly, the straw distributing assembly including a trough section extending from one side of the supporting frame to the other, the trough section including panels affixed to the supporting frame, the bottom edges of the panels being spaced from one another to form a slot opening therebetween, the straw distributing assembly including an auger member disposed in a generally horizontal position above the slot opening, a roll member disposed in a generally horizontal position below the slot opening with a portion of the roll member extending into the slot opening, the roll member having an irregular outer surface, the roll member and the auger member being disposed with their axes generally parallel and their peripheries adjacent to each other, and drive mechanism for rotating the auger member and the roll member in the same direction at coordinated speeds of rotation.

17 Claims, 4 Drawing Figures

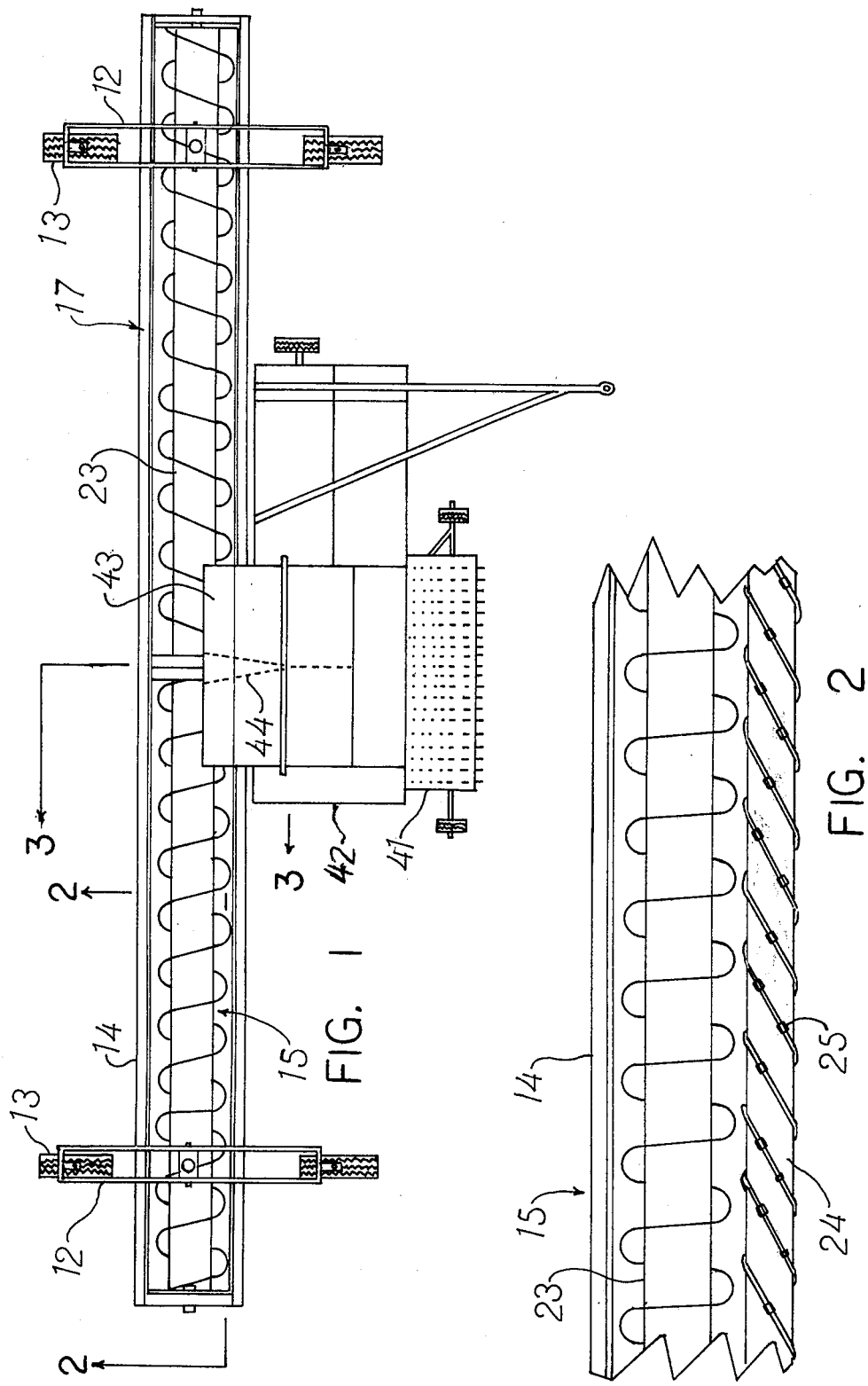

STRAW DISTRIBUTING APPARATUS

This invention relates to a novel straw distributing apparatus and more particularly relates to a new apparatus for distributing chopped straw.

In the harvesting of a grain crop from a growing field, harvesting machinery such as a combine is passed over the field to gather the grain. Combines cut the standing crop and transfer the cut crop into the combine where the grain is separated and collected and the straw is then returned to the field. Ordinarily, the straw is dropped onto the ground in a window behind the combine.

Disposal of the straw can be a problem. One way of disposing of the straw is to burn it. The burning must be carefully monitored so that it is confined to the straw. Otherwise, the entire field may catch on fire, and the fire may spread to surrounding areas. A further problem with burning is the loss of nutrient and mulch values which results as compared with returning the straw to the soil.

Another way of disposing of the straw is to chop it into short lengths and to distribute it back onto the field. A straw chopper follows the combine collecting the straw, chopping it into short lengths and blowing or throwing it back onto the field. Because of the low density of the straw, it can be blown or thrown through the air only a limited distance such as fifteen or twenty feet even under ideal conditions, that is, no wind. However, if there is an adverse wind, that is, the straw must be directed into the wind, the straw will be distributed unevenly over an even shorter distance.

The problem of straw blowing or throwing becomes more complicated as the width of cut increases with new combines being developed. Corresponding increases in effective width of straw distributors are not evolving as quickly however, so it is not feasible to spread straw behind wider cut combines and similar harvestors.

If the straw is not distributed uniformly over the field, seeding is more difficult because of the poor seed bed. The uneven seeding results in non-uniform crop growth and lower harvest yields.

In view of the shortcomings of the above described straw disposal methods, the farmer presently is left with two solutions, neither of which is desirable. The straw can be collected and baled. However, since baled straw has only a limited market, it may be necessary to transfer the bales to a dump or suitable burning place. Thus, baling the straw may involve considerable time and expense without any return.

If baling the straw is not acceptable, the farmer is left with the alternative of blowing or throwing the straw as best he can and then plowing or otherwise cultivating the fields a sufficient number of passes until the straw is distributed relatively uniformly. However, the necessity for cultivating for straw distribution eliminates the possibility of no-till cropping.

No-till cropping which is increasing in popularity each year involves seeding, growing and harvesting of crops without cultivation. The seed is spread onto a field having standing stubble. It is important that the standing stubble be allowed to remain since the stubble holds snow and thus adds moisture to the soil. Also, the standing stubble holds the seed in place. Because it is important that standing stubble be allowed to remain with no-till cropping, burning of the straw is not feasible since the standing stubble also will be burned off. With cultivation for straw distribution not possible and spreading straw with a blower or thrower being limited to relatively short distances, wide cut combines and harvestors presently cannot be employed efficiently with no-till cropping. If it is essential that wide cut harvestors be utilized, then the straw must be baled and removed. It is apparent from the above discussion that none of the present methods for disposing of straw provide a desirable solution for no-till cropping.

The present invention provides a novel straw distributing apparatus that is suitable for use under a wide variety of conditions. The straw spreading apparatus of the invention is especially useful for no-till cropping. The straw distributing apparatus of the present invention provides uniform distribution over wide areas on each pass so that it can be used with wide cut combines and harvestors.

The straw distributing apparatus of the invention utilizes a unique design which provides a high degree of uniformity in the distribution of the straw. The straw spreader also enables the operation of the apparatus to be controlled to provide optimum distribution while the apparatus is moving over a field. Furthermore, the straw distributor can be adjusted for variations in the quantity, toughness, brittleness, length, density and other characteristics of the straw being distributed.

The straw distributing apparatus of the invention is of a design that can be fabricated from commercially available components and materials. The straw distributor can be manufactured relatively inexpensively utilizing conventional metal fabricating techniques employing semi-skilled labor.

The straw spreader of the invention can be set-up and operated by farm hands after only a minimum of instruction. Moreover, the design of the straw spreader enables farm hands to perform most maintenance and repair on the apparatus conveniently and quickly. Furthermore, the design of the straw spreader minimizes maintenance.

Other benefits and advantages of the novel straw distributing apparatus of the present invention will be apparent from the following description and the accompanying drawings in which:

FIG. 1 is a top view of one form of the straw distributing apparatus of the invention in combination with straw chopping apparatus;

FIG. 2 is an enlarged sectional view of the straw distributing apparatus taken along line 2—2 of FIG. 1;

Figure 3:
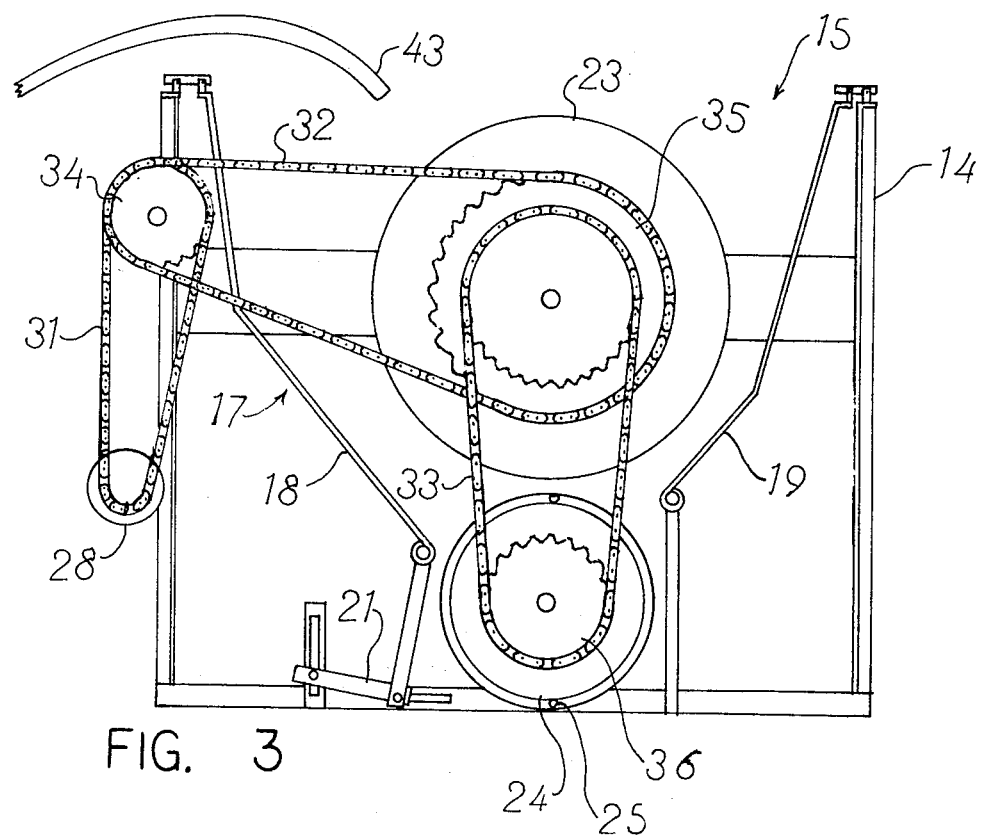
FIG. 3 is an enlarged end view of the straw distributing apparatus shown in FIG. 1.

As shown in the drawings, one form of the novel straw distributing apparatus of the present invention includes carriage portions 12 having wheels 13. A supporting frame 14 is disposed on the carriages 12. Advantageously the supporting frame 14 is pivotally connected to wheeled carriages 12.

A straw distributing assembly 15 supported on frame 14 includes a trough section 17 formed by a front panel 18 and a back panel 19. The bottom portions of the front and rear panels 18 and 19 are spaced from one another to form a longitudinal slot opening therebetween. The trough section 17 extends from one side of the supporting frame 14 to the other. The panels 18 and 19 advantageously are affixed adjacent their upper edges to the supporting frame 14. Preferably, at least one of the panels 18 and 19 is pivotally mounted on the supporting frame 14 to provide for changes in the size of the slot opening. Preferably, means are associated with the bottom, free portions of the panels 18 and 19 for adjusting the size of the slot opening. For example, adjustable brackets 21 may connect the bottom portion of one of the panels with the supporting frame 14.

The straw distributing assembly 15 includes an auger member 23 and a roll member 24. Auger member 23 is disposed in a generally horizontal position above the slot opening. Roll member 24 also is disposed in a generally horizontal position. A portion of the roll member extends into the slot opening. The auger member 23 and the roll member 24 are disposed with their axes generally parallel to one another and their peripheries adjacent each other. Advantageously, the outer surfaces of the auger member 23 and the roll member 24 are spaced from each other between about one-third and two-thirds the diameter of the roll member at the straw receiving end. Preferably, the axes of the auger member 23 and the roll member 24 converge from the straw receiving end of the trough section 17 to the opposite end of the trough section.

Roll member 24 has an irregular outer surface. The irregularities may take the form of a roughened surface or more advantageously they may be protuberances or nubs 25 extending from the surface of the roll member. Preferably, the nubs are utilized with continuous rods arranged in a spiral pattern with a pitch between about one and four times the diameter of the roll member 24.

The auger member 23 advantageously is larger than the roll member 24, and preferably between about one and three times the diameter of the roll member. The auger member 23 has a pitch between about one-half and one and one-half times the diameter thereof.

The rotation of the auger member 23 and the roll member 24 is in the same direction and the speeds of rotation are coordinated. Drive means 27 are provided to rotate the auger member 23 and the roll member 24. The drive means 27 also may include a hydraulic motor 28. Ordinarily, the hydraulic motor 28 may be energized from the hydraulic system of the towing vehicle (not shown), preferably with a speed control.

Figure 4:
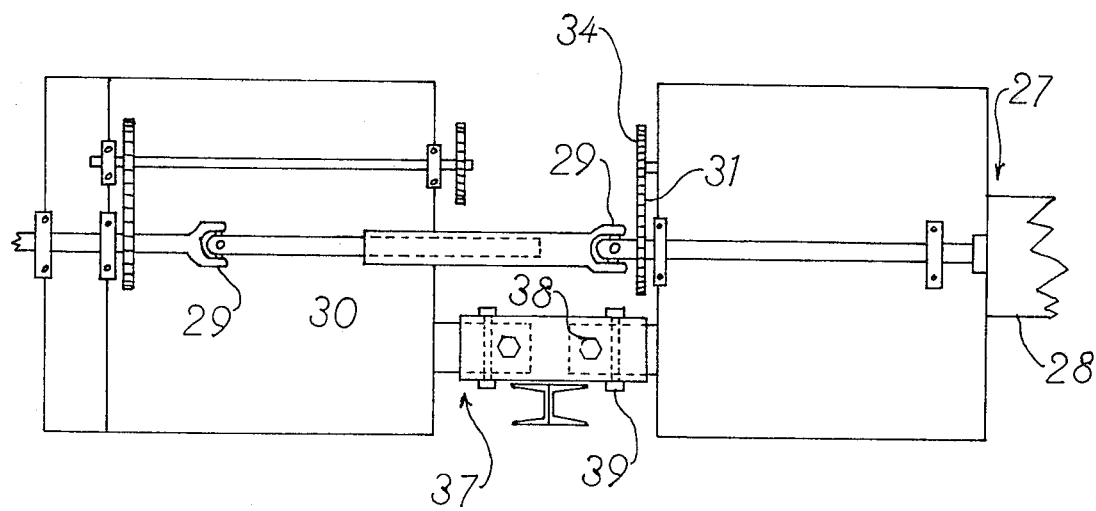
FIG. 4 is an enlarged fragmentary front view of the drive portion of the straw spreading apparatus shown in FIG. 1.

The drive means 27 advantageously includes a drive train with flexible joints such as universal joints 29 and slip joints 30 as shown in FIG. 4. This arrangement facilitates movement of the straw distributing apparatus over uneven ground since it allows for movement of the distributor assembly with respect to the motor 28.

The driving of the auger member 23 and the roll member 24 advantageously is achieved through a suitable chain and sprocket arrangement. This enables the speeds of rotation of the two members to be coordinated. As shown, a chain 31 drives sprocket 34 which in turn drives chain 32. Chain 32 drives double sprocket 35 on auger member 23. Chain 33 extends between sprocket 35 and sprocket 36 associated with roll member 24. With this arrangement, motor 28 located on the outside of the trough sections 17 can drive auger member 23 and roll member 24 at coordinated speeds.

The movement of the straw distributing apparatus of the invention also is facilitated by the pivotal connection of the two distributor assemblies with connectors 37 and either pins 38 or 39. Pins 38 enable one assembly to move upward and downward with respect to the other. The use of pins 39 with pins 38 removed allows the two trough sections 17 to be folded back. With this construction, it is desirable that wheels 13 be pivotable with respect to carriage 12. Folding of the trough sections 17 allows the apparatus of the invention to achieve a broad distribution of straw with each pass over a field while permitting the apparatus to be moved conveniently through a gate or along a road.

The straw distributing apparatus of the present invention as described above may be employed in tandem with a straw pickup 41 and chopping apparatus 42. The straw pickup and chopping apparatus may be any of those commercially available. One suitable chopper manufactured by Hesston includes a revolving cylinder with hinged hammer elements acting against a row of concave teeth.

The straw exiting the chopper 42 is transferred to the straw spreading apparatus of the invention with suitable conveying means such as the chute 43 shown in the drawings. The chute 43 is curved with an open bottom. The chute includes guide means shown as a generally V-shaped divider 44. The divider 44 divides the straw exiting from the chopper 42 into two streams with one stream being directed into the delivery end of each trough section, that is, the trough ends adjacent to each other.

In the operation of the straw distributing apparatus of the present invention as shown in the drawings, the apparatus is attached to a towing vehicle such as a tractor (not shown) in combination with a straw pickup 41 and a straw chopper 42. The drive units of the various machines are connected to the tractor. Hydraulic motor 28 may be connected to the hydraulic system of the tractor. The combination then is ready to be pulled over a field in which straw has been deposited in windrows by a combine or other harvestor.

The machinery is positioned as it is drawn over the field so that the straw pickup 41 will be aligned with the windrows. The straw is collected by the pickup unit 41 and transferred to the straw chopper 42. The chopped straw exiting the chopper is directed by chute 43 and divider 44 thereof into the receiving ends of the trough sections 17.

The chopped straw entering the trough sections 17 is advanced by the rotation of the auger member 23 along the length of the trough section. As the chopped straw moves along the length of the trough section, some of the straw moves downwardly into contact with the roll member 24. The chopped straw contacting the roll member 24 is carried into the nip between the roll member and the auger member 23 rotating at speeds controlled by hydraulic motor 28.

Although the auger member 23 and the roll member 24 are rotating in the same direction, at the nip, the members are moving in different directions. This cross movement assists in the separation of the straw into individual pieces. The individual pieces travel around the periphery of the roll member 24 and are scattered on the ground. Since the axes of the auger member 23 and the roll member 24 converge slightly from the straw receiving end of the trough section 17 to the opposite end, the same separating action is achieved even though the amount of straw in the trough section diminishes along its length.

When the straw distribution has been completed in a field and it is desired to move the apparatus to another field, the trough sections 17 can be folded back to reduce the effective width thereof. This may be accomplished by inserting pins 39 into openings in connector 37 and removing pins 38. The trough sections 17 then can be pivoted about the vertical pins 39. With the wheels 13 pivotally connected to carriages 12, the apparatus can be moved through a gate or along a road conveniently. To set-up the apparatus for use again, the trough sections are returned to a straight position, pins 38 reinserted and pins 39 removed.

The above description and the accompanying drawings show that the present invention provides a novel straw distributing apparatus with features not available on straw spreaders previously available. The straw distributor of the invention provides uniform distribution of straw over broad areas on each pass which makes it advantageous to use with wide cut combines and harvestors. Furthermore, the operation of the apparatus of the invention is not significantly affected by wind.

The straw distributing apparatus of the invention enables the operation to be controlled to provide optimum distribution of the straw. The apparatus can be adjusted to compensate for variations in the characteristics of the straw being distributed such as length, density, brittleness, toughness and the like.

The straw distributor can be set-up and operated by farm hands after only a minimum of instruction. Furthermore, the design enables farm hands to perform most of the maintenance and repair of the apparatus. In addition, the design minimizes maintenance.

The straw distributing apparatus of the present invention is of a unique design which enables it to be fabricated relatively inexpensively utilizing conventional metal fabricating techniques. The apparatus can be manufactured from commercially available components and materials employing semi-skilled labor.

It will be apparent that various modifications can be made in the particular straw distributing apparatus described in detail above and shown in the drawings within the scope of the invention. For example, the size and configuration of the components can be changed to meet specific requirements. Also, the number and disposition of the trough sections can be different for particular operating conditions. Although the apparatus ordinarily would be fabricated of steel and similar metals, under certain situations it may be advantageous to use other materials such as plastics and the like. Therefore, the scope of the invention is to be limited only by the following claims.

What is claimed is:

1. Apparatus for distributing chopped straw substantially uniformly including a wheeled carriage, a supporting frame disposed on said wheeled carriage, and a straw distributing assembly, said straw distributing assembly including a trough section extending from one side of said supporting frame to the other, said trough section including panels affixed to said supporting frame, the bottom edges of said panels being spaced from one another to form a slot opening therebetween, said straw distributing assembly including an auger member disposed in a generally horizontal position above said slot opening, a roll member cooperative with said auger member, said roll member being disposed in a generally horizontal position below said slot opening with a portion of said roll member extending into said slot opening, said roll member having an outer surface with protuberances, said roll member and said auger member being disposed with their axes generally parallel and their peripheries adjacent to each other, said axes of said roll member and said auger member converging from the straw receiving end to the opposite end thereof, said outer surfaces of said roll member and said auger member being spaced from each other between about one-third and two-thirds the diameter of said roll member at the straw receiving end, and drive means for rotating said auger member and said roll member in the same direction and at coordinated speeds of rotation.

2. Straw distributing apparatus according to claim 1 including a second distributing assembly with the two assemblies extending in a generally straight line transversely of the normal direction of travel of the apparatus.

3. Straw distributing apparatus according to claim 2 wherein said two distributing assemblies are pivotaly connected to each other.

4. Straw distributing apparatus according to claim 2 including means for delivering chopped straw adjacent the adjoining portions of said two distributing assemblies.

5. Straw distributing apparatus according to claim 4 wherein said auger members are capable of advancing chopped straw from the juncture of said two distributing assemblies toward the free ends thereof.

6. Straw distributing apparatus according to claim 4 wherein said delivery means includes guide means for dividing the flow of chopped straw therethrough.

7. Straw distributing apparatus according to claim 2 wherein said two distributing assemblies are driven by a hydraulic motor through a drive train including universal joints.

8. Straw distributing apparatus according to claim 1 wherein said outer surface protuberances are arranged in a spiral pattern.

9. Straw distributing apparatus according to claim 8 wherein said protuberances on said roll member are spaced in a spiral pattern having a pitch between about one and four times the diameter of said roll member.

10. Straw distributing apparatus according to claim 1 wherein said protuberances extend from the outer surface of said roll member a distance less than about one-fourth of the diameter of said roll member.

11. Straw distributing apparatus according to claim 1 wherein said auger member has a pitch between about one-half and one and one-half times the diameter thereof.

12. Straw distributing apparatus according to claim 1 wherein the diameter of said auger member is between about one and three times the diameter of said roll member.

13. Straw distributing apparatus according to claim 1 including adjusting means for changing the size of said slot opening.

14. Straw distributing apparatus according to claim 13 including means associated with the bottom portions of said panels of said trough section for adjusting the size of said slot opening.

15. Straw distributing apparatus according to claim 1 wherein said drive means includes a chain and sprocket arrangement coordinating the rotation of said auger member and said roll member.

16. Straw distributing apparatus according to claim 1 wherein said drive means includes a hydraulic motor.

17. Straw distributing apparatus according to claim 1 wherein said supporting frame is pivotally connected to said wheeled carriage.

* * * * *